(12) United States Patent
Nozaki et al.

(10) Patent No.: US 6,668,488 B2
(45) Date of Patent: Dec. 30, 2003

(54) GLASS RUN FOR MOTOR VEHICLE

(75) Inventors: Masahiro Nozaki, Nishikasugai (JP); Norihide Ohta, Nishikasugai (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/939,555

(22) Filed: Aug. 28, 2001

(65) Prior Publication Data

US 2002/0046499 A1 Apr. 25, 2002

(30) Foreign Application Priority Data

Aug. 30, 2000 (JP) ........................ 2000-260231

(51) Int. Cl.[7] .................. E05D 15/16; E06B 7/16; B60J 1/08
(52) U.S. Cl. .................. 49/441; 49/489.1; 296/146.2
(58) Field of Search .............. 49/440–443, 436, 49/428, 475.1, 489.1, 495.1; 296/146.2

(56) References Cited

U.S. PATENT DOCUMENTS

| | | | | |
|---|---|---|---|---|
| 2,917,340 A | * | 12/1959 | Hencken | 49/441 X |
| 4,648,207 A | * | 3/1987 | Shibasaki | 49/441 |
| 4,663,888 A | * | 5/1987 | Okamoto | 49/441 |
| 4,809,463 A | * | 3/1989 | Schroder et al. | 49/441 X |
| 4,864,774 A | | 9/1989 | Onishi et al. | |
| 5,007,202 A | | 4/1991 | Guillon | |
| 5,365,698 A | * | 11/1994 | Nozaki | 49/441 |
| 6,023,888 A | * | 2/2000 | Dover | 49/441 |
| 6,115,969 A | | 9/2000 | Nozaki | |
| 6,185,869 B1 | * | 2/2001 | Kawai | 49/441 |
| 6,412,226 B1 | * | 7/2002 | Nozaki et al. | 49/441 |

FOREIGN PATENT DOCUMENTS

| | | | |
|---|---|---|---|
| DE | 26 13 193 | 9/1977 | |
| DE | 31 14 157 | 10/1982 | |
| FR | 2690654 | * 11/1993 | 49/475.1 |
| GB | 1 103 963 | 2/1968 | |
| GB | 2 172 642 | 9/1986 | |

* cited by examiner

*Primary Examiner*—Hugh B. Thompson
(74) *Attorney, Agent, or Firm*—Posz & Bethards, PLC

(57) ABSTRACT

A glass run for use in a motor vehicle, which is capable of preventing the increase in a sliding resistance against a door glass which is raised and lowered in the glass run. At least one inclined surface is formed in an inside surface of a side wall of the glass run from the position corresponding to a projecting end of a seal lip which extends obliquely inwardly from an opening-side end of the side wall, to a bottom wall. The inclined surface is defined such that the distance between the inclined surface and the door glass gradually increases toward a bottom-side end of the side wall. The inclined surface enables the projecting end of the seal lip which is pushed by the door glass toward the side wall to move smoothly therealong, thereby preventing the increase in the pressing force of the door glass against the seal lip.

8 Claims, 3 Drawing Sheets

FIG. 2(A)        PRIOR ART

GLASS RUN FOR MOTOR VEHICLE

CROSS-REFERENCE TO RELATED APPLICATION

This application is related to and claims priority from Japanese Patent Application No. 2000-260231, the contents of which are incorporated herein by reference.

BACKGROUND OF THE INVENTION

1. Field of the Invention

The present invention relates to a glass run for attachment to a door of a motor vehicle.

2. Description of Related Art

As shown in FIG. 1, a conventional glass run 10 is attached to a door frame 12 around a window opening of a vehicle door 14 and frame members 16a, 18a which extend from the lower ends of a front vertical portion 16 and a rear vertical portion 18 of the door frame 12 into a door panel of the vehicle door 14.

As shown in FIG. 2, the conventional glass run 10 includes a main body 20 having a generally U-shaped cross-section, and seal lips 22 and 24 which extend obliquely inwardly from open ends of side walls 26 and 28 of the main body 20.

A channel 30 having a generally U-shaped cross-section is provided along an inner periphery of the door frame 12. The frame members 16a, 18a in the door panel also have a cross-section substantially identical to that of the channel 30.

The glass run 10 is attached into the channel 30 of the door frame 12 as well as the frame members 16a, 18a extending into the door panel. The glass run 10 serves to guide a door glass 32 as it is raised and lowered, and form a seal between a periphery of the door glass 32 and the door frame 12 when the door glass 32 is raised to close the window opening of the vehicle door 14.

The glass run, particularly the substantially vertical portions, is required to provide low sliding resistance against the door glass as it is raised and lowered therealong. To achieve this low sliding resistance, films of various lubricating agents have been formed on at least the contact surfaces of the seal lips. With this reliance on lubricating films, however, the sliding resistance may still exhibit undesirable increases.

In a conventional arrangement, the increase in the sliding resistance is mainly caused by the door glass pushing the seal lips toward facing side walls of the glass run so that projecting ends of the seal lips are pressed against an inside surface of at least one of side walls.

The door glass and the door frame are generally arranged to curve gently in conformity with a side surface profile of the vehicle body, and to incline the top portion toward the interior of the vehicle body. Accordingly, an inevitable difference in curvature is created between at least portions of the door frame and the door glass. Further, variations in the attachment position of the door glass may also occur, causing the door glass as it is raised or lowered along the glass run to be offset toward at least one of side walls. Consequently, the projecting end of one seal lip will be pressed against a facing side wall.

In particular, where, as shown in FIG. 2(A), the seal lip 22 of the glass run 10 is longer than the seal lip 24, the longer seal lip 22 is pushed by the door glass 32 so that, as shown in FIG. 2(B), a projecting end 22a of the seal lip 22 is strongly pressed on the inside surface of the side wall 26, and consequently, the projecting end 22a of the seal lip 22 will not slide easily along the inside surface of the side wall 26 toward a bottom wall of main body 20. When this occurs, the door glass 32 is unable to push the seal lip 22 further toward the side wall 26, resulting in an increased pressing force between the door glass 32 and the seal lip 22 that increases the sliding resistance of the glass run 10 against the door glass 32.

Furthermore, where, as shown in FIG. 2(A), the side walls 26 and 28 are tapered to gradually decrease the distance therebetween toward the bottom wall of the main body 20, the projecting end 22a of seal lip 22 becomes more difficult to move along the inside surface of the side wall 26, thereby further increasing the sliding resistance between the glass run 10 and the door glass 32.

One option to prevent this increase in the sliding resistance, is to decrease the thickness of the side wall 26, thereby enlarging the distance between the projecting end 22a of the seal lip 22 and the inside surface of the side wall 26. With this arrangement, however, the thin side wall 26 tends to be undesirably deformed as the seal lip 22 is gradually pushed by the door glass 32 toward the side wall 26.

Another option is to decrease the thickness of the projecting end 22a of the seal lip 22, thereby reducing the force of the seal lip 22 against the inside surface of the side wall 26 resulting from the same displacement. With this arrangement, however, the durability of the seal lip 22 is reduced and undesirable undulations may occur along the thin projecting end of the seal lip 22 with the passing of time.

SUMMARY OF THE INVENTION

It is an object of the present invention to provide a glass run capable of preventing an increase in a sliding resistance of a glass run against a door glass even when the door glass is offset toward one of side walls of the glass run causing a projecting end of one of seal lips to press against an inside surface of the side wall.

The glass run of the present invention has a main body with a generally U-shaped cross section, which is configured to be attached into a channel provided along an inner periphery of a door frame, and a pair of seal lips which extend obliquely inwardly from open ends of side walls of the main body for holding a periphery of a door glass from both sides. An inclined surface is formed in one part of inside surfaces of the side walls of the main body, which ranges from the position corresponding to an projecting end of a facing seal lip to a bottom end of the side wall. The inclined surface is defined such that the distance between the inclined surface and a facing surface of the door glass which is held by the pair of seal lips gradually increases toward the bottom end of the side wall. When the door glass presses the projecting end of the seal lip on the inside surface of the side wall, the projecting end can move smoothly along the inclined surface toward the bottom wall, thereby minimizing any increase in the sliding resistance of between the door glass and the glass run.

The present invention can be preferably applied to a glass run of which the side walls are tapered to gradually decrease the distance therebetween toward the bottom wall of the main body.

In addition, the present invention can be preferably applied to a glass run of which one seal lip is longer than the other seal lip.

Other objects, features, and characteristics of the present invention will become apparent upon consideration of the following description and the appended claims with reference to the accompanying drawings, all of which form a part of this specification.

DETAILED DESCRIPTION OF THE INVENTION

Figure 1:
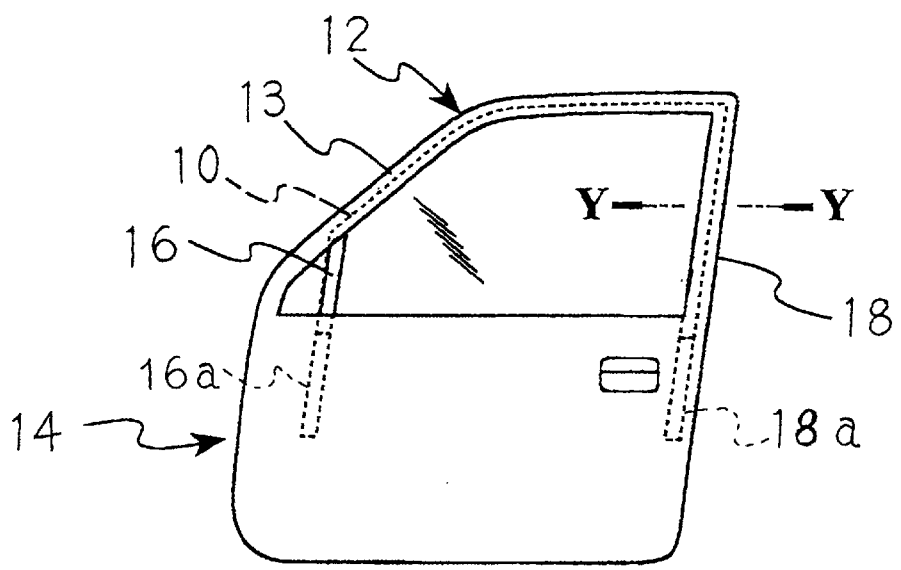
FIG. 1 is a front view of a door of a motor vehicle, to which a glass run is attached.
Figure 1:
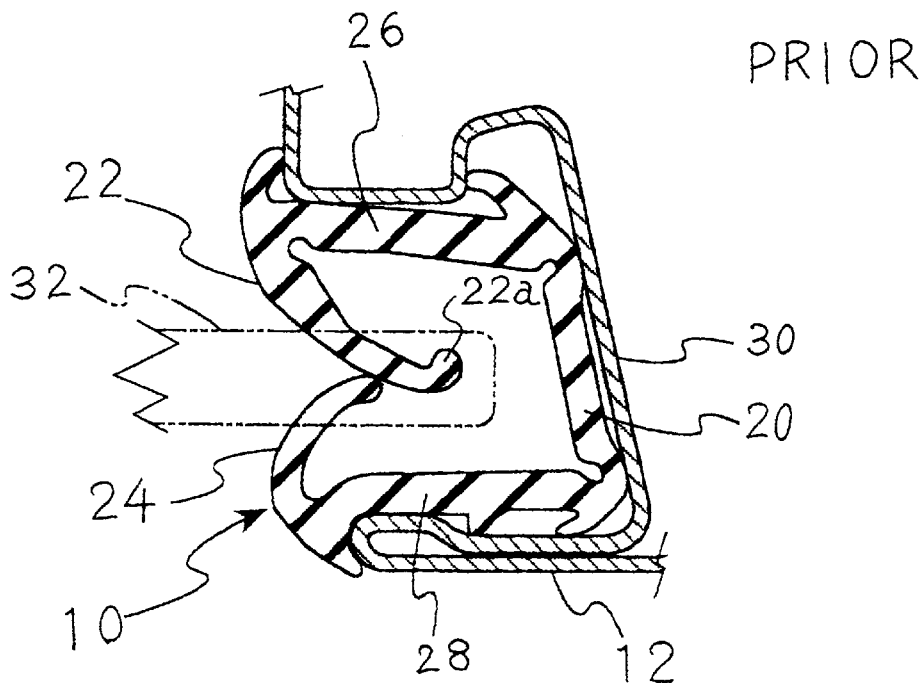
Figure 2:
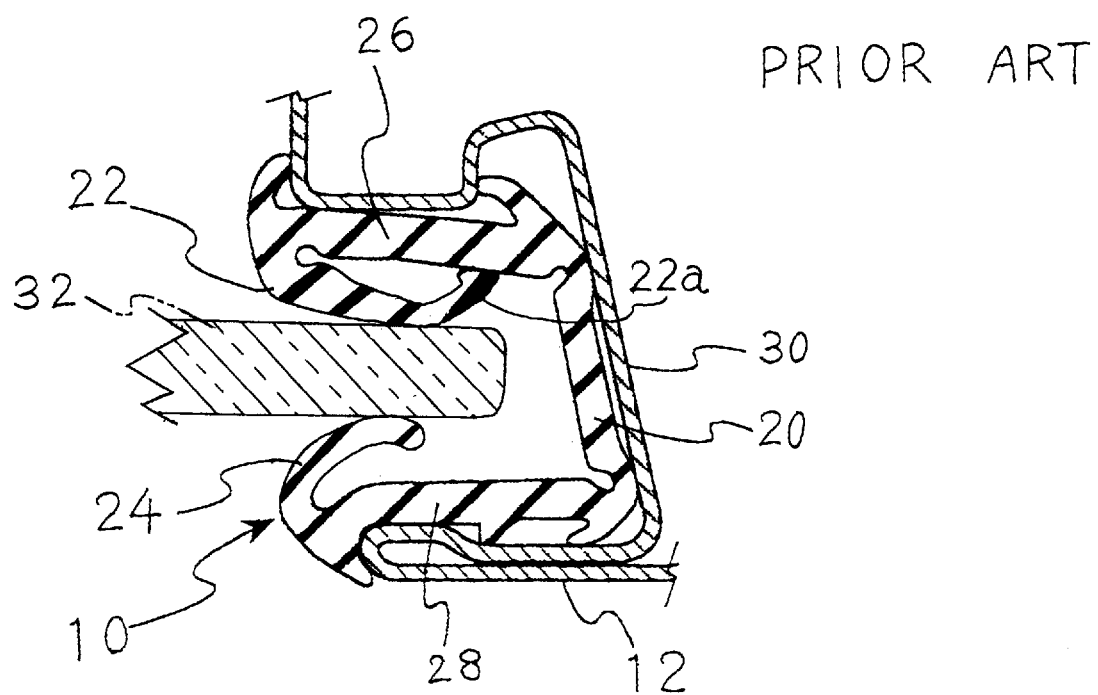
FIG. 2(A) is a cross-sectional view of a conventional glass run attached to the motor vehicle, taken along the line Y—Y of FIG. 1.
FIG. 2(B) is a cross-sectional view illustrating the state of one seal lip of the glass run of FIG. 2(A) being pressed by a door glass on a side wall of the glass run.
Figure 3A:
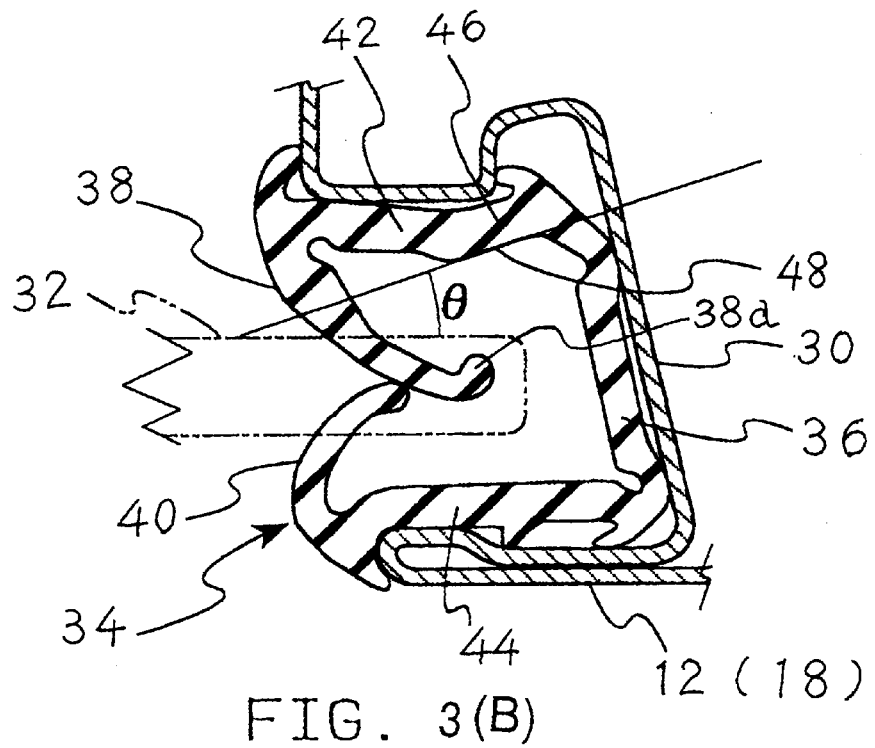
FIG. 3(A) is a cross-sectional view of a glass run in accordance with the present invention, which is attached to the motor vehicle, taken along the line Y—Y of FIG. 1.
Figure 3B:
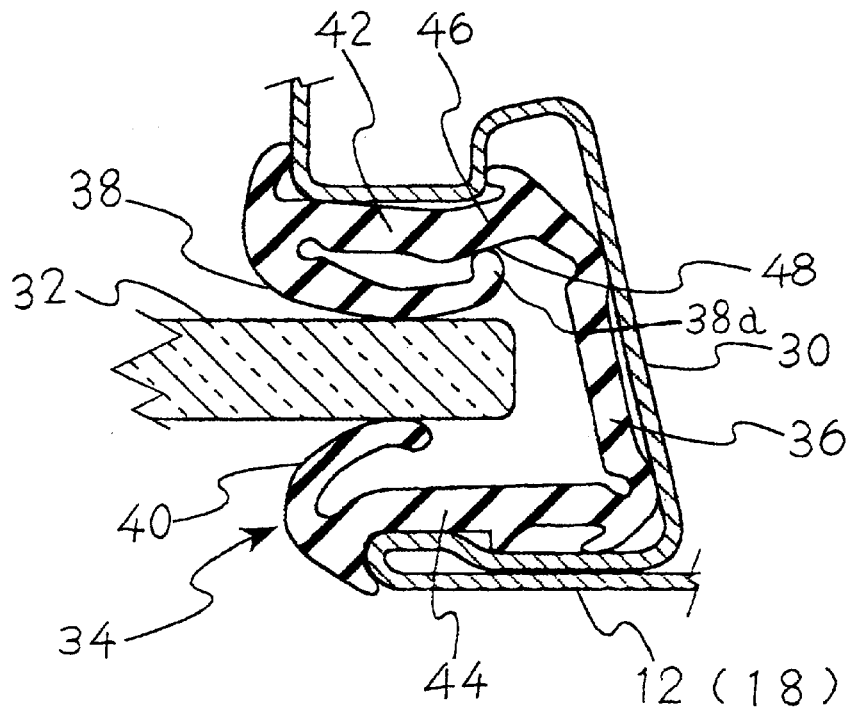
FIG. 3(B) is a cross-sectional view illustrating the state of one seal lip being pressed by a door glass on a side wall of the glass run.

As shown in FIGS. 3(A) and 3(B), a glass run 34 is inserted into a channel 30 which is provided along an inner periphery of a door frame 12 of a vehicle door 14 (FIG. 1) as well as frame members 16a and 18a, each having a cross-section substantially identical to that of the channel 30, which are located within a door panel of the vehicle door 14. The glass run 34 is obtained by connecting extruded glass run members composed of an EPDM rubber or thermoplastic olefin elastomer (TPO) with moldings that conform to corners formed between an upper frame portion 13 and front and rear vertical frame portions 16 and 18.

FIG. 3(A) illustrates a preferred embodiment of the attachment of the glass run 34 along the rear vertical frame portion 18 of the door frame 12. The glass run 34 includes a main body 36 having a generally U-shaped cross-section and seal lips 38 and 40 which extend inwardly from open ends of facing side walls 42 and 44 of the main body 36. The main body 36 is attached into the channel 30, which also has a generally U-shaped cross-section, which is provided along the vertical frame portion 18 of the door frame 12. The distance between the side walls 42 and 44 decreases gradually toward the bottom wall of the main body 36.

The seal lip 40 which extends from the side wall 44 is configured to be shorter than the seal lip 38 which extends from the side wall 42 with the seal lip 38 projecting further into the interior of the main body 36. The seal lips 38 and 40 curve toward the respective side walls to form into a convex configuration for receiving the door glass 32. To impart shape-retention to the projecting ends 38a and 40a of the seal lips 38 and 40, they are formed thicker into an arc-shaped cross-section.

The bottom-side portion of the side wall 42 which faces the longer seal lip 38 is bent outwardly relative to the opening-side portion at a position corresponding to the projecting end 38a of the seal lip 38 to form an inclined portion extending to the bottom wall. In this case, "the position corresponding to the projecting end of the seal lip 38" means a position on the side wall 42 a little apart toward an opening end of the side wall 42 from the point on the side wall 42 at which the projecting end 38a of the seal lip 38 will normally contact the side wall 42 when displaced by the door glass 32.

An inside surface of a resultant inclined portion 46 of the side wall 42 defines an inclined surface 48 extending toward the bottom wall of the glass run 34. The distance between the inclined surface 48 and the door glass 32 which is held by the seal lips 38 and 40 gradually increases toward the bottom-side end of the side wall 42.

As illustrated in the FIGS. 3(A) and 3(B), the entire bottom-side portion of the side wall 42 is bent to define the inclined portion 46 having the inclined surface 48. Alternatively, only the inside surface of the side wall 42 may be inclined to define the inclined surface 48.

When the door glass 32 enters the glass run 34, as shown in FIG. 3(B), the seal lip 38 is pushed by the door glass 32 toward the side wall 42, and the projecting end 38a of the seal lip 38 contacts the inclined surface 48 provided on the side wall 42. When the seal lip 38 is pushed even further toward the side wall 42 by the door glass 32, the projecting end of the seal lip 38 moves along the inclined surface 48 toward the bottom-side end thereof without exhibiting increased resistance from the inclined surface 48. This result is obtained because the inclined surface 48 allows the projecting end 38a of the seal lip 38 to move smoothly toward the bottom-side end when pushed by the door glass 32. Consequently, the seal lip 38 is permitted to move further toward the side wall 42, and accordingly, the pressing force between the seal lip 38 and the door glass 32 does not increase.

The preferred inclination angle a of the inclined surface 48 to the surface of the door glass 32 ranges from about 5° to 20°. In cases where the angle is less than 5°, even if the inclined surface 48 is designed to have such inclination angle to the door glass 32 based on designed attaching positions of the door frame 12 and door glass 32, in practice, such a small inclination angle is difficult to obtain consistently due to variations in the curvatures and attaching positions of the door frame 12 and door glass 32. In cases where the angle is more than 20°, where, as shown in FIG. 3(A), the bottom-side portion of the side wall 42 defines the inclined portion 46, the width of the bottom wall of the main body 36 is also enlarged, it becomes more difficult to attach the glass run 34 to the channel 30, and where only the inclined surface 48 is formed in the inside surface of the side wall 42, the thickness of the bottom-side end of the side wall 42 must be decreased, whereby the attachment between the glass run 34 and the channel 30 becomes unstable.

In the preceding embodiment, the present invention has been explained in accordance with the glass run for attachment along the rear vertical portion 18 of the door frame 12. A similar inclined surface is provided in a glass run for attachment along the front vertical portion 16 of the door frame 12. In addition, when both seal lips have symmetrical configurations, and project deeply to the interior of the glass run, similar inclined surfaces may be provided on both inside surfaces of the side walls 42 and 44. Such inclined surfaces may also be provided in side walls of the glass run for attachment to the upper frame portion 13 of the door frame 12 in addition to the glass runs for attachment to the vertical frame portions 16 and 18 thereof.

With the glass run in accordance with the present invention, when the seal lips are pushed by the door glass toward the side walls of the glass run, and projecting ends of the seal lips are pressed against the inside surfaces of the side walls, the projecting ends of the seal lips smoothly move along the inclined surfaces. The inclined surfaces are configured to allow the projecting ends of the seal lips to move smoothly, and as a result prevents the pressing force between the door glass and the seal lips from increasing appreciably over a wider range of door glass displacement. Accordingly, the door glass can be raised and lowered by applying only small forces and without generating any squeaking, rubbing or rustling noise caused by movement of the door glass along the seal lips, or any slippage of the attached glass run.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for attachment along an inner periphery of a door frame structure of a motor vehicle, for guiding a door glass as it is raised and lowered, and for forming a seal between a peripheral portion of the door glass and the door frame structure when the door glass is raised to close a window opening of a door, the glass run comprising:

a main body having a generally U-shaped cross section comprising a bottom wall, a first side wall, a second side wall, and an opening that define a run cavity configured for receiving and supporting the peripheral portion of the door glass, the main body being adapted to be inserted into a channel provided along the inner periphery of the door frame structure wherein the first side wall has an opening-side inner surface and a bottom-side inner surface, the bottom-side inner surface of the first side wall is configured to be inclined at an angle with respect to the door glass when the door glass is in a raised position such that a distance between the bottom-side inner surface of the first side wall and a first side of the peripheral portion of the door glass increases toward the bottom wall;

a first flexible seal lip configured to extend obliquely inwardly from an opening end of the first side wall into the run cavity, wherein an inside surface of the first flexible seal lip is adapted to contact the first side of the peripheral portion of the door glass extending into the run cavity, and a projecting end of the first flexible seal lip extends towards the bottom-side inner surface of the first side wall so as to enable the projecting end to contact the bottom-side inner surface of the first side wall; and a second flexible seal lip configured to extend obliquely inwardly from an opening end of the second side wall into the run cavity and to contact a second side of the peripheral portion of the door glass extending into the run cavity, wherein the first and second flexible seal lips are adapted to be pushed toward their respective side walls by contact with the peripheral portion of the door glass, whereby when the first flexible seal lip is pushed toward the first side wall by contact with the first side of the peripheral portion of the door glass, and the projecting end of the first flexible seal lip contacts the bottom-side inner surface of the first side wall, the projecting end of the first flexible seal lip moves along the inclined bottom-side inner surface of the first side wall towards the bottom wall of the main body.

2. The glass run as claimed in claim 1, wherein the first side wall has a substantially uniform thickness and the distance between the bottom-side inner surface of the first side wall and the first side of the peripheral portion of the door glass increases at a substantially constant rate.

3. The glass run as claimed in claim 2, wherein, after the glass run is inserted into the channel, the opening has a width that is greater than a width of the bottom wall.

4. The glass run as claimed in claim 1, wherein the first flexible seal lip has a first length and the second flexible seal lip has a second length, the first length being unequal to the second length.

5. The glass run as claimed in claim 4, wherein the first length is greater than the second length.

6. The glass run as claimed in claim 1, wherein the bottom-side inner surface of the first side wall is adapted to be inclined at an angle of between 5° and 20° with respect to a first side of the door glass.

7. The glass run as claimed in claim 1, wherein the bottom-side inner surface of the first side wall, which is inclined, is provided in the glass run for attachment along vertical frame portions of the door frame structure.

8. The glass run as claimed in claim 1, wherein each of the first flexible seal lip and the second flexible seal lip includes a projecting end for providing contact with the first side wall and the second side wall of the main body, respectively.

* * * * *